United States Patent
Bothwell et al.

(10) Patent No.: US 10,802,482 B2
(45) Date of Patent: Oct. 13, 2020

(54) REVERSE TACTILE CUE FOR ROTORCRAFT ROTOR OVERSPEED PROTECTION

(71) Applicant: Textron Innovations Inc., Providence, RI (US)

(72) Inventors: Christopher Mike Bothwell, Grapevine, TX (US); Luke Dafydd Gillett, Grapevine, TX (US); Jillian Samantha Alfred, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 945 days.

(21) Appl. No.: 15/443,493

(22) Filed: Feb. 27, 2017

(65) Prior Publication Data

US 2018/0246510 A1 Aug. 30, 2018

(51) Int. Cl.
*B64C 13/50* (2006.01)
*G05D 1/00* (2006.01)
(Continued)

(52) U.S. Cl.
CPC ........... *G05D 1/0055* (2013.01); *B64C 13/10* (2013.01); *B64C 13/343* (2018.01);
(Continued)

(58) Field of Classification Search
CPC ..... B64C 13/507; B64C 13/10; B64C 13/345; B64C 13/343; B64C 27/57; G05D 1/0055;
(Continued)

(56) References Cited

U.S. PATENT DOCUMENTS 3,733,039 A * 5/1973 O'Connor ............... B64C 27/32
244/181
6,644,600 B1 * 11/2003 Olson ................... B64C 13/345
244/221
(Continued)

FOREIGN PATENT DOCUMENTS

EP 1485892 A1 12/2004
WO 03081554 A1 10/2003

*Primary Examiner* — Peter D Nolan
(74) *Attorney, Agent, or Firm* — Slater Matsil, LLP

(57) ABSTRACT

A flight control computer (FCC) for a rotorcraft includes a processor and a non-transitory computer-readable storage medium storing a program to be executed by the processor, with the program including instructions for providing main rotor overspeed protection. The instructions for providing the main rotor overspeed protection include instructions for monitoring sensor signals indicating a main rotor RPM, determining a target operating parameter, determining one or more flight parameters in response to a relationship between the main rotor RPM and the target operating parameter indicating a main rotor overspeed condition. Determining the one or more flight parameters includes determining a setting for a flight control device of the rotorcraft that changes the main rotor RPM, controlling positioning of a pilot control according to the flight parameters, and controlling the flight control device of the rotorcraft according to positioning of the pilot control.

20 Claims, 7 Drawing Sheets

(51) Int. Cl.
  *B64C 27/57* (2006.01)
  *B64C 13/28* (2006.01)
  *B64C 13/10* (2006.01)
  *F02C 9/28* (2006.01)
  *F02C 9/58* (2006.01)

(52) U.S. Cl.
  CPC .......... *B64C 13/345* (2018.01); *B64C 13/507* (2018.01); *B64C 27/57* (2013.01); *F02C 9/28* (2013.01); *F02C 9/58* (2013.01); *F05D 2220/329* (2013.01); *F05D 2270/021* (2013.01)

(58) Field of Classification Search
  CPC ........ F02C 9/58; F02C 9/28; F05D 2220/329; F05D 2270/021; B64D 31/06
  See application file for complete search history.

(56) References Cited

U.S. PATENT DOCUMENTS

| | | | | |
|---|---|---|---|---|
| 6,695,264 B2* | 2/2004 | Schaeffer | ............ | B64C 29/0033 244/223 |
| 6,735,500 B2* | 5/2004 | Nicholas | .................. | B64C 27/56 701/3 |
| 7,098,811 B2* | 8/2006 | Augustin | ............... | B64C 13/345 340/965 |
| 7,126,496 B2* | 10/2006 | Greene | .................... | B64C 27/57 340/946 |
| 7,262,712 B2* | 8/2007 | Greene | .................. | B64D 43/00 340/965 |
| 7,440,825 B2* | 10/2008 | Einthoven | ............ | G05D 1/0858 244/186 |
| 7,930,074 B2* | 4/2011 | Cherepinsky | ........ | G05D 1/0858 701/12 |
| 8,271,151 B2* | 9/2012 | Hasan | ..................... | B64C 13/00 701/3 |
| 8,594,864 B2* | 11/2013 | Greenfield | ............. | B64D 43/00 244/175 |
| 8,655,509 B2* | 2/2014 | Shirota | .................. | B64C 13/345 701/3 |
| 9,102,400 B2* | 8/2015 | Cherepinsky | ......... | B64C 13/503 |
| 9,108,741 B2* | 8/2015 | Nicholls | ................ | B64D 45/00 |
| 9,156,546 B2* | 10/2015 | Irwin, III | .............. | B64C 13/345 |
| 9,868,513 B2* | 1/2018 | Sandri | ...................... | B64C 13/18 |
| 9,886,039 B2* | 2/2018 | Gillett | .................. | G05D 1/0607 |
| 10,074,245 B2* | 9/2018 | Jayaraman | ............... | G08B 6/00 |
| 10,474,237 B2* | 11/2019 | Gush | ...................... | B64C 27/56 |
| 2003/0094539 A1* | 5/2003 | Schaeffer | ............ | B64C 29/0033 244/17.13 |
| 2004/0010354 A1* | 1/2004 | Nicholas | .................. | B64C 27/56 701/4 |
| 2005/0004721 A1* | 1/2005 | Einthoven | ............ | G05D 1/0858 701/4 |
| 2005/0151672 A1* | 7/2005 | Augustin | ............... | B64C 13/345 340/965 |
| 2006/0071817 A1* | 4/2006 | Greene | .................... | B64C 27/57 340/965 |
| 2006/0219840 A1* | 10/2006 | Einthoven | ............ | G05D 1/0858 244/17.13 |
| 2008/0234881 A1* | 9/2008 | Cherepinsky | ........ | G05D 1/0858 701/7 |
| 2008/0283671 A1* | 11/2008 | Cherepinsky | ......... | B64C 13/503 244/195 |
| 2009/0266940 A1* | 10/2009 | Miller | ..................... | B64C 27/56 244/223 |
| 2012/0072056 A1* | 3/2012 | Hasan | ..................... | B64C 13/00 701/3 |
| 2013/0054053 A1* | 2/2013 | Greenfield | ............. | B64D 31/04 701/3 |
| 2013/0099064 A1* | 4/2013 | Cherepinsky | ......... | B64C 13/503 244/223 |
| 2013/0221153 A1* | 8/2013 | Worsham, II | ........ | B64C 27/006 244/17.13 |
| 2015/0073628 A1* | 3/2015 | Nicholls | ................ | B64D 45/00 701/14 |
| 2015/0232176 A1* | 8/2015 | Gillett | .................. | G05D 1/0607 416/1 |
| 2016/0304190 A1* | 10/2016 | Grohmann | ............ | B64C 13/22 |
| 2017/0017241 A1* | 1/2017 | Gillett, Jr. | ............... | B64C 27/56 |
| 2017/0275011 A1* | 9/2017 | Luszcz | .................... | B64C 27/57 |
| 2018/0093757 A1* | 4/2018 | Honnorat | ............ | B64C 13/0421 |
| 2019/0033969 A1* | 1/2019 | Gush | ...................... | B64C 13/04 |

\* cited by examiner

US 10,802,482 B2

REVERSE TACTILE CUE FOR ROTORCRAFT ROTOR OVERSPEED PROTECTION

TECHNICAL FIELD

The present invention relates generally to a system and method for automated flight control in a rotorcraft, and, in particular embodiments, to a system and method for providing, in a rotorcraft, a tactile cue through a pilot control indicating a main rotor overspeed condition.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

A rotorcraft embodying the presented principles includes a collective pilot control, a collective trim assembly connected to the collective pilot control, the collective trim assembly operable to move the collective pilot control according to a collective set command and to generate a collective position signal indicating a position of the collective pilot control, one or more flight control devices operable to control flight of the rotorcraft in response to a received flight control device control signal, and a flight control computer (FCC) in signal communication with the collective trim assembly and the one or more flight control devices and operable to provide overspeed protection for a main rotor of the rotorcraft. The FCC is further operable to determine, in response to the FCC determining that a relationship between a main rotor revolutions per minute (RPM) and an RPM threshold indicates a main rotor overspeed condition, a flight parameter associated with reducing the main rotor RPM. The FCC is further operable to determine the flight parameter according to the RPM threshold, to determine a pilot control setting according to the flight parameter and generate the collective set command according to the pilot control setting, and to generate the flight control device control signal according to the collective position signal, and to send the flight control device control signal to the one or more flight control devices.

An embodiment flight control computer (FCC) for a rotorcraft includes a processor, and a non-transitory computer-readable storage medium storing a program to be executed by the processor, with the program including instructions for providing main rotor overspeed protection. The instructions for providing the main rotor overspeed protection include instructions for monitoring sensor signals indicating a main rotor revolutions per minute (RPM), determining a target operating parameter, determining one or more flight parameters in response to a relationship between the main rotor RPM and the target operating parameter indicating a main rotor overspeed condition, where the determining the one or more flight parameters includes determining a setting for one or more flight control devices of the rotorcraft that changes the main rotor RPM, controlling positioning of one or more pilot controls according to the flight parameters, and controlling the one or more flight control devices of the rotorcraft according to positioning of the one or more pilot controls.

An embodiment method for operating a rotorcraft includes monitoring, by a flight control computer (FCC), a plurality of first sensor signals indicating a main rotor revolutions per minute (RPM) of the rotorcraft, determining a predicted main rotor RPM according to the plurality of first sensor signals, determining one or more target operating parameters according to a second signal indicating one or more operating parameters of the rotorcraft, determining that a main rotor is in an overspeed condition in response to one of the main rotor RPM or the predicted main rotor RPM falling outside of a threshold associated with the one or more target operating parameters within a predetermined time period, determining a flight parameter according to the one or more target operating parameters and in response to determining that the main rotor is in the overspeed condition, sending a set signal to a trim motor indicating a first position of one or more pilot controls according to the flight parameter, and controlling one or more flight control devices of the rotorcraft according to positioning of the one or more pilot controls.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
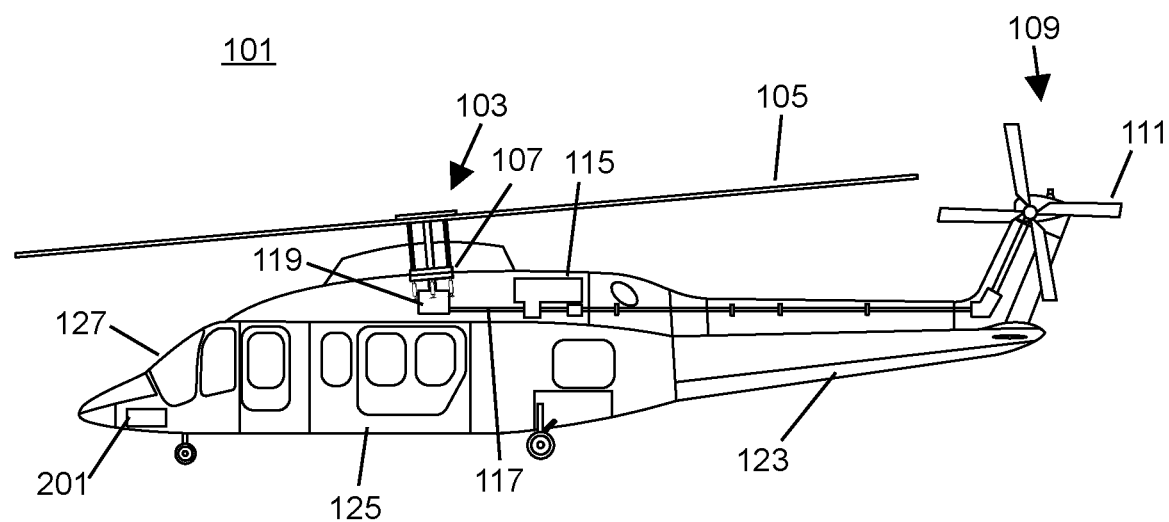
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system presented herein are directed to providing a rotor overspeed protection function using a tactile cue through the pilot controls of a rotorcraft. In some embodiments, the FBW system measures the revolutions per minute (RPM) of the main rotor, and if the main rotor is in or approaching an overspeed condition, drives a collective stick of the rotorcraft to increase the collective and reduce the rotor RPM. The drive provides a force felt by the pilot in the collective stick so the pilot is cued to the rotor overspeed condition. The FBW system attempts to keep the main rotor speed or RPM substantially constant, or within a threshold related to the target RPM.

The FBW system attempts to drive the collective stick to a position that would create a stable flight position and maintain the main rotor speed within a desired threshold. In an embodiment, in the case of an RPM or overspeed condition, the FBW provides a reverse tactile cue to alert the pilot of the overspeed condition. A force cue driving the collective stick upwards to increase the collective angle of the main rotor blades may be used, and may be a soft stop that the pilot can push downward through. The pilot may override the drive of the collective stick, but will feel the force driving the collective. In some embodiments, the tactile cue for rotor overspeed protection is a continuously variable tactile feedback. Thus, the pilot may be cued to the rotor overspeed condition without requiring that the pilot monitor instruments in the cockpit.

A rotor overspeed condition is associated with the rotor RPM increasing by, for example, the pilot quickly lowering the collective or pitching the rotorcraft up rapidly. FBW systems, particularly when combined with a flexing rotor system, allow for lighter main rotor blades with less mass than, for example, blades of an articulated rotor. The lighter blades have less inertia than heavier blades, and are more easily accelerated by external forces. For example, when a pilot rapidly pitches the nose of the rotorcraft up during forward flight at low collective setting, the increased pitch of the rotorcraft causes increased airflow through the main rotor, rapidly increasing the speed or RPM of the main rotor. Overspeeding the rotor, or permitting the rotor to turn faster that the engine is driving the rotor, may cause damage to the main rotor drive system, and the overspeed protection acts as a tactile warning that the RPM is approaching a structural limit.

The connection between the main rotor and the engine is a one way drive. The main rotor is able to freewheel in the direction of rotation. Thus, the main rotor may accelerate to an RPM faster than the engine drives the main rotor blades. This arrangement permits autorotation by the main rotor blades in case of engine failure, since the main rotor uses a combination of inertia, forward and vertical airspeed and low collective pitch to maintain main rotor rotation. Additionally, the freewheel or one way drive connection between the main rotor and driveline permits the main rotor to maintain rotation should the transmission or engine failure lock or seize since the seized elements would not stop the rotation of the main rotor.

The FBW system attempts to maintain the main rotor at a predetermined rotor speed or within a rotor RPM range. In some embodiments, the rotorcraft may have one or more predetermined rotor speeds that are used in different flight modes. For example, a higher main rotor RPM may be used in a takeoff, hover, or landing flight mode than in a cruising flight mode, or a main rotor RPM for a low speed flight mode may be different than the main rotor RPM at a moderate or high speed flight mode. The FBW system may monitor the main rotor RPM, and determine whether the RPM is at, or approaching a preferred or target main rotor RPM or the boundaries of a threshold associated with the preferred or target main rotor RPM. For example, the FBW system may continuously monitor the engine speed and other operating parameters, and determine whether the main rotor speed, the rate of change of the main rotor speed, a combination of the main rotor speed and the rotor speed rate of change, or one or more other operating parameters indicate that the main rotor speed is outside of an target range or threshold related to the target main rotor RPM, or is predicted to move outside of the target range or threshold within a predetermined time period. The FBW system compares a determined target rotor speed with the actual or predicted rotor speed to identify or predict a rotor RPM overspeed condition. The FBW system then determines a collective stick position that would provide a stable flight position and reduce the main rotor to within acceptable limits. The FBW system then uses the actual collective stick position to control the collective setting of the main rotor. Using the actual collective stick position permits the pilot to override the collective stick position suggested or set by the FBW system, and avoid the FBW system needing to otherwise determine whether the pilot input or FBW collective positioning should be used for the collective setting.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
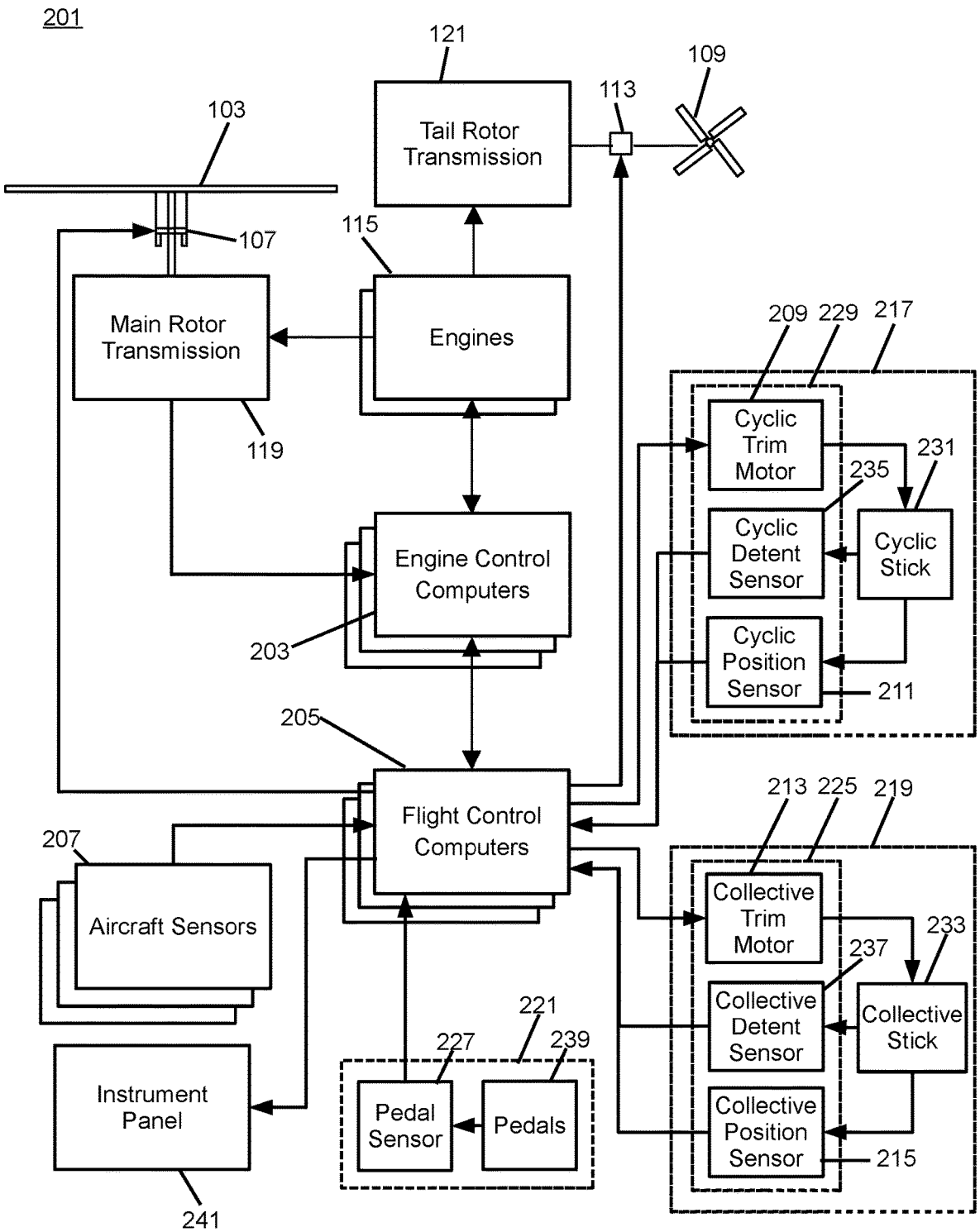
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured RPM of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
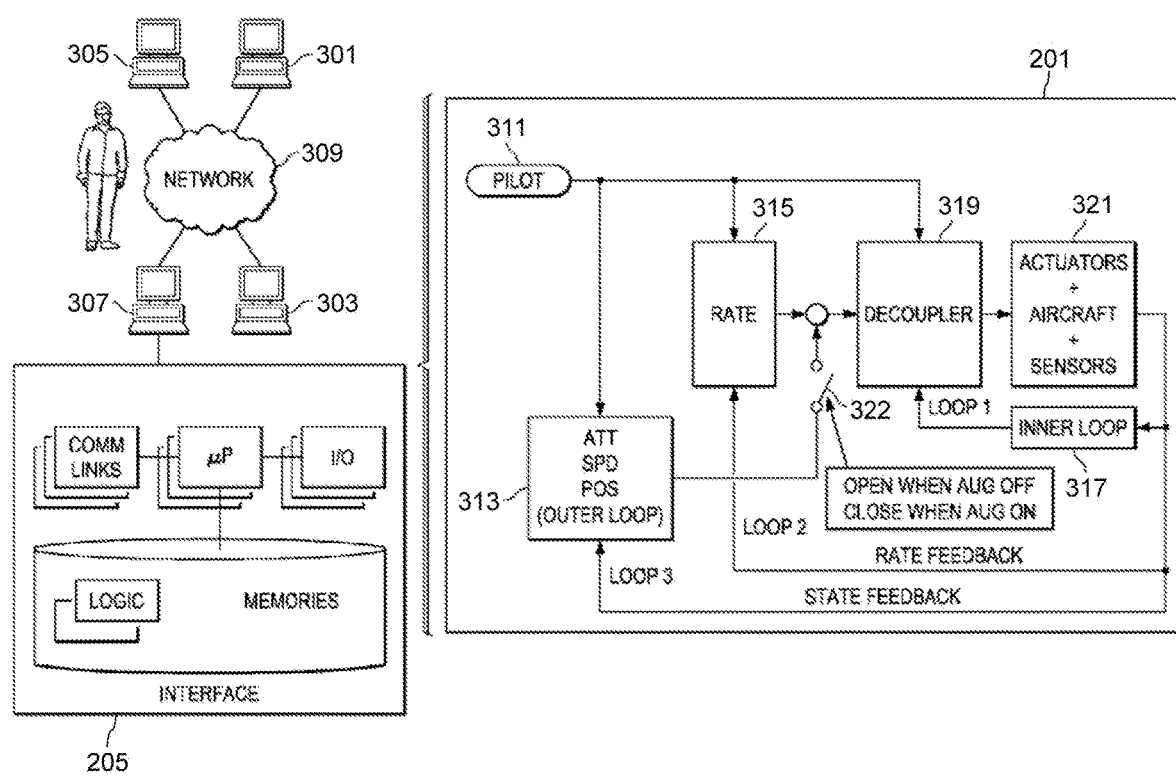
FIG. 3 representatively illustrates a three-loop flight control system 201 according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

In some embodiments, the RPM overspeed protection function may be implemented or controlled in the outer loop 313. In an embodiment, the overspeed protection function may be software running on the FCCs 205, and may cause the inner loop 317 to perform the overspeed protection by activating a state machine that monitors feedback from the ECCUs indicating the engine operating parameters and adjusts the position of the collective stick accordingly. The inner loop 317 may receive sensor data from aircraft equipment 321 such as sensors or other instrumentation, and adjust the collective stick position, collective setting and/or power setting to maintain the main rotor RPM within the limits of associated main rotor RPM threshold or range. Thus, the inner loop 317 may continuously monitor the engine or main rotor operating parameters and adjust flight parameters such as the collective setting accordingly. In another embodiment, the outer loop 313 may monitor feedback from the ECCUs, determine any adjustments to the collective setting, and then cause, signal or message the inner loop 317 to set, adjust or hold the collective stick position.

Figure 4A:
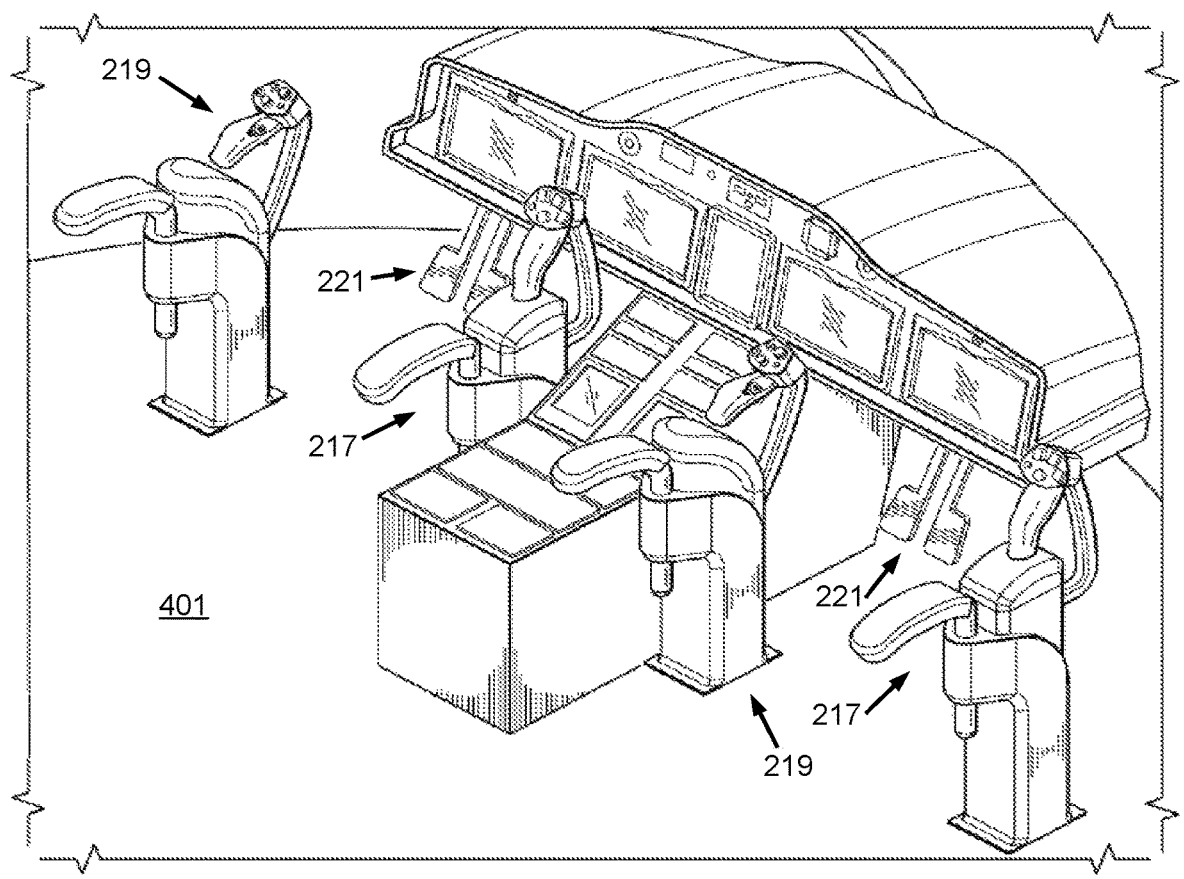
FIG. 4A is a diagram illustrating a cockpit control arrangement according to some embodiments.

FIG. 4A is a diagram illustrating a cockpit control arrangement 401 according to some embodiments. In some embodiments, a rotorcraft has three sets of pilot flight controls in three flight control assemblies that include cyclic control assemblies 217, collective control assemblies 219, and pedal control assemblies 221. A set of each pilot flight control is provided for each pilot (which may include a pilot-in-command and a co-pilot or backup pilot).

In general, cyclic pilot flight controls may allow a pilot to provide cyclic inputs through the cyclic control assembly 217 to set or adjust a cyclic configuration of the main rotor blades, which changes the angle of the individual main rotor blades as the main rotor rotates. This creates variable amounts of lift at varied points in the rotation cycle, causing the rotorcraft to pitch or roll. Collective pilot flight controls may allow a pilot to provide collective inputs through the collective control assembly 219 to set or adjust a collective configuration of the main rotor blades so that the angle of attack for all main rotor blades may be collectively altered by equal amounts and at the same time, resulting in ascent, descent, acceleration, and deceleration. Anti-torque pilot flight controls may allow a pilot to change the amount of anti-torque force applied to the rotorcraft. Tail rotor blades may operate to counter torque created by driving the main rotor. Anti-torque pilot flight controls may allow a pilot to provide pedal inputs through the pedal control assembly 221 and change the amount of anti-torque force applied to change a heading of the rotorcraft. For example, providing anti-torque force greater than the torque created by driving the main rotor may cause the rotorcraft to rotate in a first direction. Similarly, providing anti-torque force less than the torque created by driving the main rotor may cause the rotorcraft to rotate in a second direction opposite the first direction. In some embodiments, anti-torque pilot flight controls may change the amount of anti-torque force applied by changing the pitch of the tail rotor blades, and increasing or reducing thrust produced by tail rotor blades.

Figure 4B:
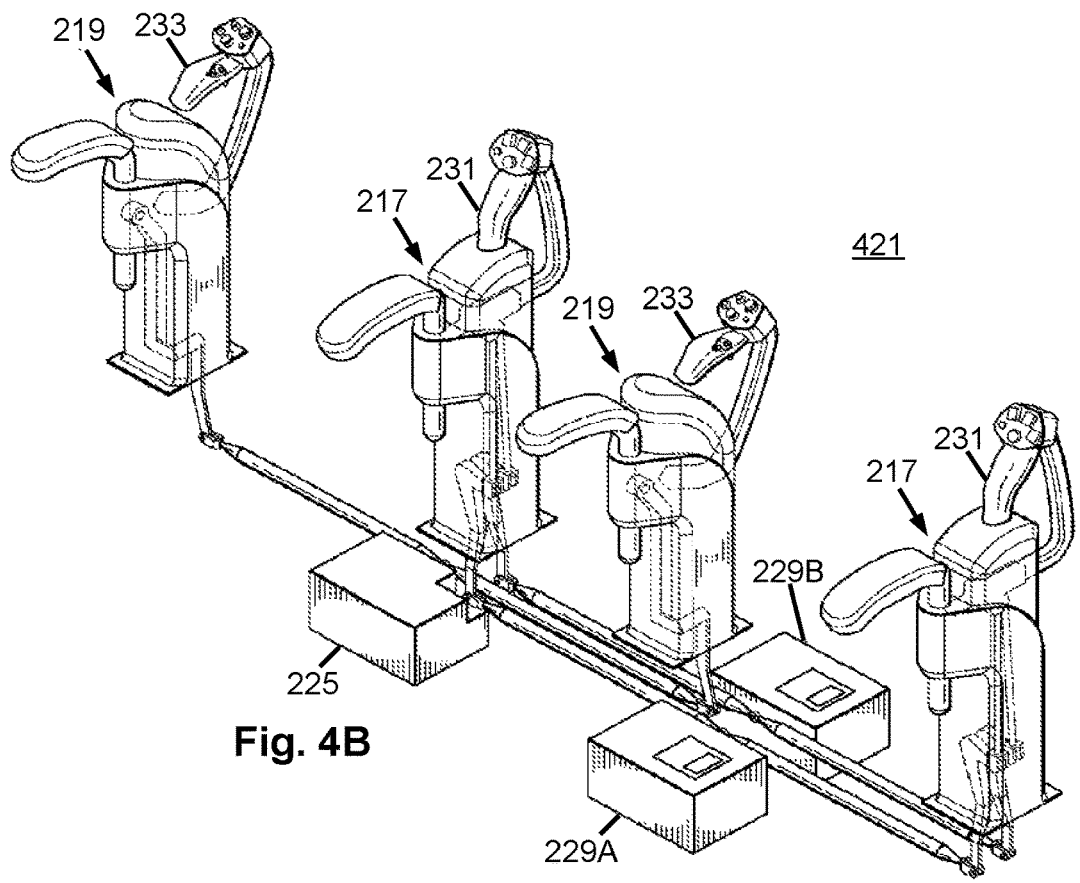
FIG. 4B is a diagram illustrating an arrangement of cyclic and collective control assemblies according to some embodiments.

FIG. 4B is a diagram illustrating an arrangement 421 of cyclic and collective control assemblies 217 and 219 according to some embodiments. In some embodiments, two cyclic control assemblies 217 and two collective control assemblies 219 are provided. The cyclic control assemblies 217 each have a cyclic stick 231 that is coupled to cyclic trim assemblies 229A and 229B. The collective control assemblies 219 each have collective stick 233 that is coupled to a collective trim assembly 225. The trim assemblies 225, 229A and 229B are operable to receive and measure mechanical communications of cyclic and collective inputs from the pilot through the respective sticks 231 and 233. In some embodiments, two cyclic trim assemblies 229A and 229B are provided and are connected to each of the cyclic control assemblies 217. One of the cyclic trim assemblies is a cyclic roll trim assembly 229A that manages roll or left/right cyclic tilting movements, and the other cyclic trim assembly is a cyclic pitch trim assembly 229B that manages pitch or front/back tilting movements. In some embodiments, the trim assemblies 225, 229A and 229B convert mechanical inputs into roll, pitch and collective position signals that are sent to the FCCs. These trim assemblies 225, 229A and 229B may include, among other items, measurement devices for measuring the position of the collective sticks 233 or the different movement axes of the cyclic sticks 231. Trim motors in each of the trim assemblies 225, 229A and 229B may drive or set the positions of the cyclic control assembly 217 or collective control assembly 219.

The cyclic trim assemblies 229A and 229B, and collective trim assembly 225 may be components of a FBW flight control system, and measurements from the cyclic trim assemblies 229A and 229B and collective trim assembly 225 may be sent to a FCC operable to instruct flight control devices to execute commands measured through the trim assemblies 225, 229A and 229B. For example, the FCC may be in communication with actuators or other devices operable to change the position of main rotor blades, and the FCC may generate cyclic control commands and/or collective control commands which are sent to the swashplate actuators or control system to control the angle of the main rotor blades.

Figure 4C:
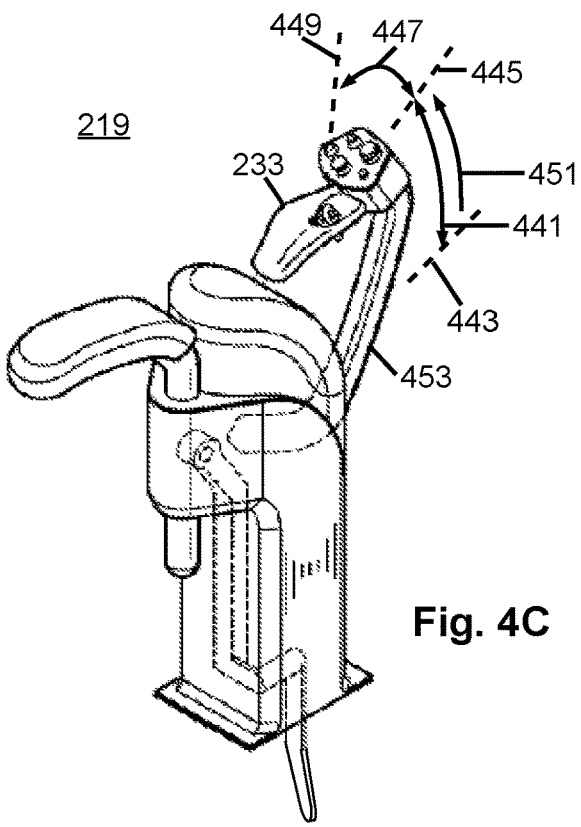
FIG. 4C is a diagram illustrating a collective control assembly and range of motion according to some embodiments.

FIG. 4C is a diagram illustrating a collective control assembly 219 and range of motion according to some embodiments. In some embodiments, the collective stick 233 is mounted on a collective stick support 453, and moves in an arc to indicate the collective position. In the FBW system, the collective stick 233 may be decoupled from the swashplate and engines, so that the range of motion of the collective stick 233 is not limited by the connection to the swashplate or engines. The collective control assembly 219 may monitor and determine the position of the collective stick 233, and the FCCs may determine a collective setting according to the position of the collective stick. In order to maintain the main rotor speed at a substantially constant RPM, the collective setting may be tied to the engine settings so that the engine provides sufficient power to maintain the rotor speed.

The collective stick 233 may have a low position 443 and a high position 445 that are respectively associated with a lowest collective setting and a maximum normal collective setting for the main rotor blades. The low position 443 and high position 445 may define or bound a normal operating range 441. In some embodiments, the normal operating range 441 includes collective settings that correspond to power settings below a threshold such as maximum continuous power. The collective stick 233 may also have a maximum position 449 associated with a collective setting corresponding to the maximum settable power. An overdrive range 447 may be defined or bounded by the maximum position 449 and the high position 445, and may include collective settings corresponding to power setting higher than the normal operating range. In some embodiments, the overdrive range 447 includes the maximum takeoff power, two minute maximum power, and thirty second maximum power settings. The low position 443, high position 445 and maximum position 449 may be stops or positions that are enforced or created by the collective trim assembly.

In some embodiments, the collective trim assembly may provide the rotor overspeed protection function by driving the collective stick 233 in a RPM overspeed protection direction 451. In some embodiments, the RPM overspeed protection direction 451 is upward, or a direction associated with raising a collective setting of the main rotor blades. FCCs may drive the collective stick 233 upward, or in the RPM overspeed protection direction 451 while the collective stick 233 remains in the normal operating range 441, and may limit the drive of the collective stick 244 to the normal operating range 441, which may prevent the collective stick 244 or setting from entering the overdrive range 447. In other embodiments, the FCCs may drive the collective stick 233 into the overdrive range 447 as part of the RPM overspeed protection. The FCCs may maintain the drive on the collective stick 233 while the main rotor remains in an overspeed condition to provide a tactile cue to the pilot warning of the overspeed condition, and may terminate driving the collective stick 233 after the main rotor speed returns to an acceptable range based on the engine speed. Additionally, the FCCs may determine the severity of the RPM overspeed or potential RPM overspeed, and may vary the upper limit of the RPM overspeed protection drive accordingly. For example, if the FCCs determine that the collective stick is at or just below the high position, and that the RPM of the main rotor is rapidly increasing at a rate where the RPM will quickly exceed the main rotor RPM threshold, the FCCs may determine a collective position that is in the overdrive range 447.

Figure 5:
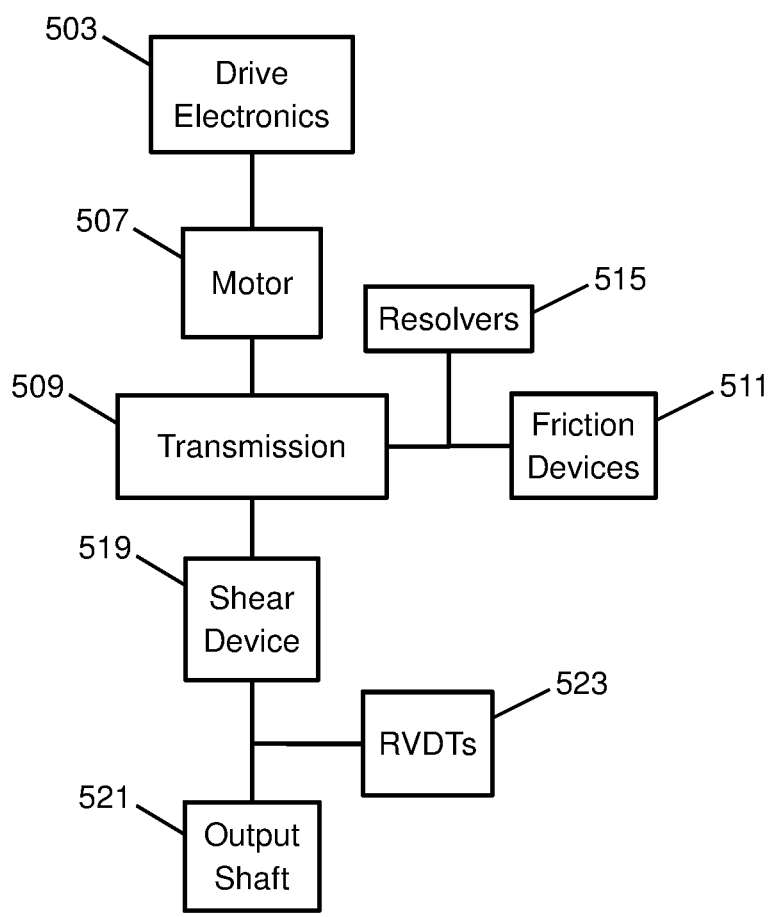
FIG. 5 is a diagram illustrating a collective trim assembly that may be used to provide main rotor revolutions per minute (RPM) overspeed protection according to some embodiments.

FIG. 5 is a diagram illustrating a collective trim assembly 501 that may be used to provide main rotor RPM overspeed protection according to some embodiments. The collective trim assembly 501 may have an output shaft 521 that drives the collective control assembly to move the collective stick. The collective trim assembly 501 has a motor 507 controlled by drive electronics 503. The drive electronics 503 may receive, from the FCCs, or from another element in the FBW system, a signal indicating how the motor 507 should perform in order to control the collective stick. For example, the FCCs may send a collective set signal indicating a position to which the motor 507 should set the collective stick.

The motor 507 is connected to a transmission 509, which is turn, connected to the output shaft 521 through a shear device 519. The motor 507 allows the FCCs to provide a drive or force similar to a spring force on the collective stick, mimicking the feel of a mechanical spring while the collective stick is mechanically disconnected from the swashplate and engines. The transmission 509 is a variable coupling that permits the motor 507 to drive the output shaft 521, but allows inputs through the output shaft 521 to override the drive by the motor 507. Thus, if the collective stick is moved or controlled by the pilot in a way that is contrary to the drive of the motor 507, the pilot's inputs overcome the force applied by the motor 507. For example, in some embodiments, the transmission 509 is a planetary gearset, an electric clutch, or the like. The shear device 519 is a coupling allowing the collective stick to separate from the transmission 509 and motor 507. For example, should the transmission 509 become jammed, or the motor 507 malfunction, the shear device 519 can be broken so that the collective stick may be moved and used without being impeded by the inoperable transmission 509 or motor 507.

In some embodiments, position sensors such as rotary variable differential transformers (RVDTs) 523 determine the rotation of the output shaft 521 and generate position signals indicating the position of the collective stick. The RVDTs 523 are disposed between the shear device 519 and the output shaft 521 so that the position of the output shaft 521 can be determined even if the shear device 519 has been broken or sheared, allowing pilot control of the rotorcraft even if the motor 507 or transmission 509, or other parts of the drive system are inoperable. In some embodiments, multiple RVDTs 523 are used to separately measure the position of the output shaft 521 for redundancy. Each FCC may be connected to a different RVDT 523 so that each FCC independently determines a position of the output shaft 521, and any disagreement between readings from different RVDTs 523 can be identified and handled.

In some embodiments, one or more friction devices 511 is connected to the transmission 509 to provide friction-type tactile feedback cues though the output shaft 521. In an embodiment, the friction devices 511 are connected to, and receive command signals from, the drive electronics 503. In other embodiments, the friction devices 511 receive command signals from outside elements, such as the FCCs. The friction devices may provide a variable friction-type feel to the collective control stick through the output shaft 521. The variable friction allows the FCCs, ultimately, to provide a friction-type feel to the collective stick that pilots are familiar with, even though the collective stick is not mechanically connected to the engines or swashplate. One or more resolvers 515 may be connected between the transmission 509 and the friction devices 511 and may act as detent sensors to determine fine motion of the collective stick indicating whether the pilot is controlling the collective stick. The resolvers 515 may provide a collective detent signal indicating control or motion of the collective stick by the pilot.

In an embodiment, the FCCs may provide the RPM overspeed protection by sending a collective set signal to the drive electronics 503 which cause the drive electronics 503 to command the motor 507 to move the output shaft 521 to a position that raises the collective stick to a position corresponding to a collective setting determined to slow the rotor RPM.

Figure 6:
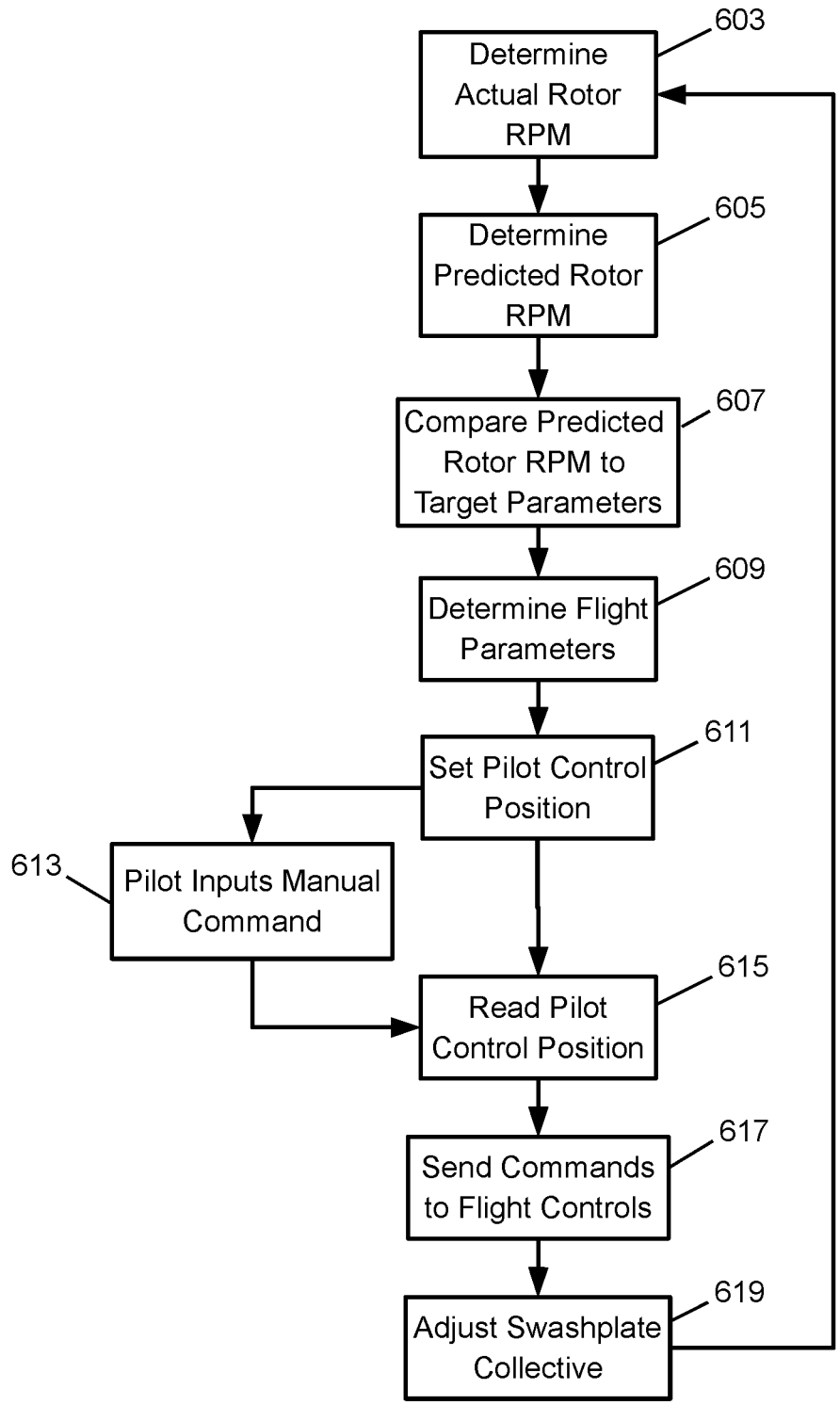
FIG. 6 is a flow diagram illustrating a method for performing an RPM overspeed protection function according to some embodiments.

FIG. 6 is a flow diagram illustrating a method 601 for performing an RPM overspeed protection function according to some embodiments. In block 603, the FCCs determine an actual rotor RPM. In some embodiments, sensors in the main rotor transmission, engine, ECCU, or the like, continuously monitor operational parameters of the rotorcraft, including the RPM of the main rotor, engine RPM, airspeed, vertical speed, attitude, altitude, and the like. In some embodiments, multiple sensor readings for the main rotor RPM maybe stored in a memory of the FCCs, or another nontransitory computer readable medium for analysis and comparison. Each reading of the main rotor RPM is a current main rotor RPM sensor reading or value until a next reading or sensor value is received.

In block 605, the FCCs determine a predicted rotor RPM. In some embodiments, the predicted rotor RPM is a rotor RPM that is predicted or determined for a current or future time using the current main rotor RPM value and/or one or more previous main rotor RPM values. The predicted main rotor RPM may be determined according to one or more sensor values or signals, which may indicate the main rotor RPM, may be used to determine a rate of change of the main rotor RPM, or may indicate one or more other operational parameters. In some embodiments, the current or actual main rotor RPM is used as the predicted main rotor RPM, essentially using a zero time interval for predicting the main rotor RPM. In other embodiments, the predicted main rotor RPM may be determined from multiple main rotor RPM values over a predetermined time. The predicted main rotor RPM may be determined by using a predictive procedure such as a derivative to determine the slope of the parameter values, a geometric projection, an algorithm or the like. For example, an FCC that has received main rotor RPM sensor values of 600, 610 and 620 RPM over a previous 2 second span may project from the previous values that, in the next two seconds, that the predicted main rotor RPM would be 640 RPM, and in next 5 seconds, the predicted main rotor RPM would be 670 RPM. The predicted main rotor RPM may be used to determine whether the main rotor is at risk of entering an overspeed condition, to predict the severity of the overspeed condition, or to predict the likelihood that a main rotor may exceed a maximum RPM threshold.

In block 607, the FCCs compare the predicted rotor RPM to one or more target parameters. The target parameters are associated with a target or desired operation of a portion of the rotorcraft. The FCCs identify a rotor overspeed condition by comparing the actual operating conditions of the rotor to the target parameters or target operation conditions. In some embodiments, the target parameters are a target main rotor speed. The FCCs may analyze operating parameters related to the predicted motor RPM, main rotor RPM rate of change, current or actual rotor RPM or another predictive or actual operational parameter with respect to one or more target parameters. The FCCs may receive signals indicating the operating parameters from, for example, aircraft equipment such as sensors, ECCUs, or the like, and compare the operational parameters to one or more target parameters, thresholds, or the like. The analysis of the operating parameters with respect to the target parameters is used to determine whether the main rotor is in, or at risk of entering, an overspeed condition.

The target parameters may be determined according to an active operating parameter such as an altitude, airspeed, or the like. In some embodiments, a target main rotor speed may be determined or scheduled in the FCCs according to altitude, airspeed of the like. The target main rotor speed may, for example, be scheduled to improve efficiency, improve performance, reduce the rotorcraft's noise footprint, or optimize other operating parameters. The FCCs determine the target main rotor RPM and send the target main rotor RPM to the ECCUs, which control engine speed and rotor RPM to achieve the target main rotor RPM. When a main rotor overspeed condition is detected or predicted, the engines may be de-clutched from the main rotor, and the FCCs may then drive the reverse tactile cueing based on the target main rotor RPM.

In some embodiments, the target parameters may include an RPM threshold, and the FCCs may determine that the main rotor is in an overspeed condition according to a relationship between the main rotor RPM and an RPM threshold. In some embodiments, the RPM threshold is a 1% variation of, or from, the target main rotor RPM. Thus, in such an embodiment, for a target main rotor RPM of 600 RPM, the threshold would be 606 RPM, and a threshold range would be between 594 and 606 RPM. In other embodiments, the threshold may be a larger variation, such as 2%, 3% or 5%. Additionally the range may not necessarily be symmetrical, with a lower threshold being different from an upper threshold. For example, a threshold range may be 95% to 101% of the main rotor target RPM, so that, for a target main rotor RPM of 600 RPM, the threshold range may be between about 570 and 606 RPM.

In some embodiments, the FCCs determine that a main rotor overspeed condition exists in response to the main rotor RPM exceeding the RPM threshold, or in response to the main rotor RPM being predicted to exceed, or fall outside of, the RPM threshold. Additionally, the FCCs may identify a potential or predicted rotor overspeed condition when the FCCs determine that the rate of change of the main rotor RPM will cause the main rotor RPM to exceed, or fall outside of, the RPM threshold within a predetermined period of time. In some embodiments, the target main rotor RPM may have an associated threshold range, and a predicted main rotor RPM falling outside of the threshold range indicates a main rotor overspeed condition. For example, for a main rotor target RPM of 600, a predicted or actual rotor RPM of 620 RPM would exceed a 1% RPM threshold (at 606 RPM) and a 3% RPM threshold range (between 582 RPM and 618 RPM), and be in a rotor overspeed condition in both threshold cases. In another example, an FCC that has received main rotor RPM values of 600, 603 and 606 RPM over a previous two second span may determine that the main rotor rate of change is +3 RPM per second, and use the rate of change or previous values to project that, in the next two seconds, the predicted main rotor RPM would be 612 RPM, and in the next five seconds, the predicted main rotor RPM would be 621 RPM. Therefore, for a main rotor target RPM of 600, the two second predicted main rotor RPM of 612 RPM would exceed, or fall outside, the 1% RPM threshold (at 606 RPM) and be within the 3% RPM threshold range (between 582 RPM and 618 RPM), while the five second predicted main rotor RPM of 621 RPM would exceed, or fall outside, both the 1% RPM threshold (at 606 RPM) and the 3% RPM threshold range (between 582 RPM and 618 RPM).

In block 609, the FCCs determine one or more flight parameters. The flight parameters are parameters at which the FCCs determine the rotorcraft should operate at to avoid, or recover from, a rotor overspeed condition. Therefore, in some embodiments, the flight parameters are determined in response to a rotor overspeed condition being identified. The flight parameters include a setting for one or more flight control devices of the rotorcraft that change the main rotor RPM and in some embodiments, may be associated with reducing the main rotor RPM. In some embodiments, the flight parameters may include a collective angle for main rotor blades of the rotorcraft or a collective control setting associated with raising a collective setting of the one or more flight control devices. In some embodiments, the FCCs determine a new collective setting for the main rotor that is greater than the current collective setting for the main rotor, and that is determined to prevent the main rotor from exceeding the main rotor threshold.

In some embodiments, the FCCs may determine the flight parameters based on the RPM threshold, main rotor speed, engine operating parameters, vertical speed, and the like. For example, in slow speed forward flight, the main rotor blades may have an 8 degree collective angle. Should the pilot pitch the nose the rotorcraft up during the forward flight, causing the rotor to speed up, the FCCs may determine that a 10 degree collective angle would maintain the main rotor RPM within the threshold. As the speed of forward flight increases, the effect of the same pitch increase becomes more severe since the higher airspeed causes more air to move through the main rotor, speeding the main rotor up more for a given pitch. Thus, the main rotor blades may have a 6 degree pitch angle during high speed forward flight, and the FCCs may determine that the 10 degree pitch angle is required to maintain the rotor speed within the threshold. The greater increase in pitch angle determined by the FCCs compensates for greater rate of change main rotor speed due to forward flight.

In some embodiments, the FCCs may use a correlation between a known drag at a particular rotor speed and engine power to determine an increase in, or value for, the collective setting that will reduce the rotor speed or rate of change of the rotor speed. The correlation may be stored in a table, calculated from an algorithm, stored from previous sensor readings, or the like. In other embodiments, the FCCs may make an initial change to the collective, and adjust the collective based on sensor feedback. The FCCs continuously monitor the main rotor RPM, and may reduce or vary the collective until the main rotor RPM or rate of change of the main rotor RPM no longer indicates a rotor overspeed condition.

In some embodiments, the FCCs may limit the flight parameters based on one or more factors. For example, the FCCs may limit the flight parameters to avoid exceeding a maximum RPM threshold. The FCCs may determine that the rotor is in an overspeed position, and may increase the collective more rapidly, or to a greater degree than would be warranted by the main rotor RPM, engine speed, or the like in order to prevent the main rotor RPM from exceeding the maximum RPM threshold. In some embodiments, the maximum RPM limit threshold may 110% or 120% of the target main rotor speed.

In block 611, the FCCs set a pilot control position. In some embodiments, the FCCs send a control set signal to one or more trim assemblies, causing the trim assemblies to set the pilot control positions. In some embodiments the FCCs generate the control set signal and cause the trim motor to drive the pilot control while the overspeed condition is maintained. The FCCs determine a pilot control setting according to the flight parameters and generate the control set signal or command according to the pilot control setting. In some embodiments, the FCCs provide the overspeed protection and tactile cueing by controlling positioning of one or more pilot controls, such as the collective stick, according to the flight parameters using the control set signals. In other embodiments, the FCCs may also control other pilot controls or flight control elements such as a cyclic control or the engines.

The FCCs may also determine a limit range within a range of movement for the pilot controls to determine a normal operating range to which the overspeed protection is limited. The FCCs may adjust the flight parameters to keep the position of the one or more pilot controls within the limit range. Thus, if the FCCs determine that the flight parameters call for a collective stick position that would be in an overdrive range, the FCCs may adjust the collective setting so that the collective stick position is not driven outside the normal operating range.

In block 613, a pilot may optionally input a manual command through the pilot control. This permits a pilot to override the position set by the FCCs. The pilot control positions are suggested positions, and driving the pilot controls by the FCCs provides a tactile cue to the pilot that the main rotor is in an overspeed condition. The tactile cue acts as a soft stop, and the pilot may pull through the force provided by positioning the pilot controls.

In block 615, the FCCs determine a pilot control position. The sensors associated with the pilot controls read the position of the pilot controls and send position signals to the FCCs. In block 617, the FCCs sent one or more commands to one or more flight control elements. The FCCs generate flight control device control signals according to the positions of the pilot controls and send the flight control device control signals to the one or more flight control devices. In some embodiments, the FCCs control the collective stick for the rotor overspeed protection and tactile cueing, and a collective position sensor generates a collective position signal which is sent to the FCCs. The FCCs generate collective control signals and send the collective control signal a collective swashplate actuator. The collective position signal is used so that, when a pilot overrides the collective positon set by the FCCs for the overspeed protection, the actual position of the collective stick is used to control the collective. Thus, the FCCs may receive a position signal indicating a position of the pilot controls that is different from the position set by the FCCs and that indicates a manual pilot control.

In block 619, the FCCs adjust, set or move a swashplate collective setting or collective flight control element. The FCCs receive the control position signals and control, for example, the collective angle of the main rotor blades according to positioning of the one or more pilot controls.

While the method 601 disclosed herein has been described in terms of discrete blocks, it should be understood that the method is not limited to the disclosed order of blocks. The FCCs continue to monitor the main rotor RPM and operation parameters, and adjust or set the collective setting while the main rotor RPM is in, or predicted to enter, the rotor overspeed condition. In some embodiments, for example, determining the actual rotor RPM and predicted rotor RPM, determining flight parameters, determining pilot control settings and setting pilot control position is a continuous feedback process to provide a protection for, or tactile cue indicating, the rotor overspeed condition.

A rotorcraft embodying the presented principles includes a collective pilot control, a collective trim assembly connected to the collective pilot control, the collective trim assembly operable to move the collective pilot control according to a collective set command and to generate a collective position signal indicating a position of the collective pilot control, one or more flight control devices operable to control flight of the rotorcraft in response to a received flight control device control signal, and a flight control computer (FCC) in signal communication with the collective trim assembly and the one or more flight control devices and operable to provide overspeed protection for a main rotor of the rotorcraft. The FCC is further operable to determine, in response to the FCC determining that a relationship between a main rotor revolutions per minute (RPM) and an RPM threshold indicates a main rotor overspeed condition, a flight parameter associated with reducing the main rotor RPM. The FCC is further operable to determine the flight parameter according to the RPM threshold, to determine a pilot control setting according to the flight parameter and generate the collective set command according to the pilot control setting, and to generate the flight control device control signal according to the collective position signal, and to send the flight control device control signal to the one or more flight control devices.

In an embodiment, the FCC is further operable to determine that the relationship between the main rotor RPM and the RPM threshold indicates the main rotor overspeed condition in response to one of the main rotor RPM exceeding the RPM threshold or the main rotor RPM being predicted to exceed the RPM threshold. In an embodiment, the FCC is further operable to determine that the main rotor RPM is predicted to exceed the RPM threshold according to the main rotor RPM and a rate of change of the main rotor RPM. In an embodiment, the FCC is further operable to determine a target main rotor RPM, and wherein the RPM threshold is associated with the target main rotor RPM. In an embodiment, the FCC is further operable to determine the target main rotor RPM according to at least one of an altitude of the rotorcraft and an airspeed of the rotorcraft. In an embodiment, the RPM threshold is a 1% variation of the target main rotor RPM. In an embodiment, the flight parameter associated with reducing the main rotor RPM includes a collective angle for main rotor blades of the rotorcraft. In an embodiment, the FCC is further operable to determine the flight parameter by determining a value for the collective angle that prevents the main rotor from exceeding a maximum RPM threshold.

An embodiment flight control computer (FCC) for a rotorcraft includes a processor, and a non-transitory computer-readable storage medium storing a program to be executed by the processor, with the program including instructions for providing main rotor overspeed protection. The instructions for providing the main rotor overspeed protection include instructions for monitoring sensor signals indicating a main rotor revolutions per minute (RPM), determining a target operating parameter, determining one or more flight parameters in response to a relationship between the main rotor RPM and the target operating parameter indicating a main rotor overspeed condition, where the determining the one or more flight parameters includes determining a setting for one or more flight control devices of the rotorcraft that changes the main rotor RPM, controlling positioning of one or more pilot controls according to the flight parameters, and controlling the one or more flight control devices of the rotorcraft according to positioning of the one or more pilot controls.

In an embodiment, the target operating parameter is a target main rotor RPM. In an embodiment, the instructions for providing the main rotor overspeed protection further include instructions for determining an RPM threshold according to the target operating parameter, and the instructions for determining one or more flight parameters in response to the relationship between the main rotor RPM and the target operating parameter indicating the main rotor overspeed condition include instructions for determining one or more flight parameters in response to the main rotor RPM falling outside of the RPM threshold, where the main rotor RPM falling outside of the RPM threshold indicates the main rotor overspeed condition. In an embodiment, the RPM threshold is a 1% variation of the target main rotor RPM. In an embodiment, the instructions for determining the one or more flight parameters include instructions for determining a new collective setting for a main rotor that is greater than a current collective setting for the main rotor, and that is determined to prevent the main rotor from exceeding a maximum RPM threshold.

An embodiment method for operating a rotorcraft includes monitoring, by a flight control computer (FCC), a plurality of first sensor signals indicating a main rotor revolutions per minute (RPM) of the rotorcraft, determining a predicted main rotor RPM according to the plurality of first sensor signals, determining one or more target operating parameters according to a second signal indicating one or more operating parameters of the rotorcraft, determining that a main rotor is in an overspeed condition in response to one of the main rotor RPM or the predicted main rotor RPM falling outside of a threshold associated with the one or more target operating parameters within a predetermined time period, determining a flight parameter according to the one or more target operating parameters and in response to determining that the main rotor is in the overspeed condition, sending a set signal to a trim motor indicating a first position of one or more pilot controls according to the flight parameter, and controlling one or more flight control devices of the rotorcraft according to positioning of the one or more pilot controls.

In an embodiment, the controlling the one or more flight control devices of the rotorcraft according to positioning of the one or more pilot controls includes receiving a position signal indicating a second position of the one or more pilot controls different from the first position and indicating a manual pilot control of the one or more flight control devices. In an embodiment, the determining the flight parameter includes determining a collective control setting associated with raising a collective setting of the one or more flight control devices and further associated with decreasing the main rotor RPM. In an embodiment, the sending the set signal to the trim motor comprises sending the set signal and causing the trim motor to drive the one or more pilot controls to the first position while the overspeed condition is maintained. In an embodiment, the method further includes determining a limit range within a range of movement for the one or more pilot controls and adjusting the flight parameter to maintain the first position of the one or more pilot controls within the limit range. In an embodiment, the determining the predicted main rotor RPM includes determining a rate of change of the main rotor RPM, and determining the predicted main rotor RPM according the main rotor RPM, and the rate of change of the main rotor RPM over a predetermined period of time. In an embodiment, the one or more target operating parameters includes a target main rotor RPM, and wherein the threshold is a 1% variation from the target main rotor RPM.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
   a collective pilot control;
   a collective trim assembly connected to the collective pilot control, the collective trim assembly operable to move the collective pilot control according to a collective set command and to generate a collective position signal indicating a position of the collective pilot control;
   one or more flight control devices operable to control flight of the rotorcraft in response to a received flight control device control signal; and
   a flight control computer (FCC) in signal communication with the collective trim assembly and the one or more flight control devices and operable to provide overspeed protection for a main rotor of the rotorcraft, wherein the FCC is further operable to determine, in response to the FCC determining that a relationship between a main rotor revolutions per minute (RPM) and an RPM threshold indicates a main rotor overspeed condition, a flight parameter associated with reducing the main rotor RPM, wherein the FCC is further operable to determine the flight parameter according to the RPM threshold, wherein the FCC is further operable to determine a pilot control setting according to the flight parameter and generate the collective set command according to the pilot control setting, and wherein the FCC is further operable to generate the flight control device control signal according to the collective position signal, and to send the flight control device control signal to the one or more flight control devices.

2. The rotorcraft of claim 1, wherein the FCC is further operable to determine that the relationship between the main rotor RPM and the RPM threshold indicates the main rotor overspeed condition in response to one of the main rotor RPM exceeding the RPM threshold or the main rotor RPM being predicted to exceed the RPM threshold.

3. The rotorcraft of claim 2, wherein the FCC is further operable to determine that the main rotor RPM is predicted to exceed the RPM threshold according to the main rotor RPM and a rate of change of the main rotor RPM.

4. The rotorcraft of claim 2, wherein the FCC is further operable to determine a target main rotor RPM, and wherein the RPM threshold is associated with the target main rotor RPM.

5. The rotorcraft of claim 4, wherein the FCC is further operable to determine the target main rotor RPM according to at least one of an altitude of the rotorcraft and an airspeed of the rotorcraft.

6. The rotorcraft of claim 4, wherein the RPM threshold is a 1% variation of the target main rotor RPM.

7. The rotorcraft of claim 1, wherein the flight parameter associated with reducing the main rotor RPM includes a collective angle for main rotor blades of the rotorcraft.

8. The rotorcraft of claim 7, wherein the FCC is further operable to determine the flight parameter by determining a value for the collective angle that prevents the main rotor from exceeding a maximum RPM threshold.

9. A flight control computer (FCC) for a rotorcraft, comprising:
   a processor; and
   a non-transitory computer-readable storage medium storing a program to be executed by the processor, the program including instructions for providing main rotor overspeed protection, the instructions for providing the main rotor overspeed protection including instructions for:
   monitoring sensor signals indicating a main rotor revolutions per minute (RPM);
   determining a target operating parameter;

determining one or more flight parameters in response to a relationship between the main rotor RPM and the target operating parameter indicating a main rotor overspeed condition, wherein the determining the one or more flight parameters includes determining a setting for one or more flight control devices of the rotorcraft that changes the main rotor RPM;

controlling positioning of one or more pilot controls according to the flight parameters; and controlling the one or more flight control devices of the rotorcraft according to the positioning of the one or more pilot controls.

10. The FCC of claim 9, wherein the target operating parameter is a target main rotor RPM.

11. The FCC of claim 10, wherein the instructions for providing the main rotor overspeed protection further include instructions for determining an RPM threshold according to the target operating parameter; and wherein the instructions for determining one or more flight parameters in response to the relationship between the main rotor RPM and the target operating parameter indicating the main rotor overspeed condition include instructions for determining one or more flight parameters in response to the main rotor RPM falling outside of the RPM threshold, wherein the main rotor RPM falling outside of the RPM threshold indicates the main rotor overspeed condition.

12. The FCC of claim 11, wherein the RPM threshold is a 1% variation of the target main rotor RPM.

13. The FCC of claim 9, wherein the instructions for determining the one or more flight parameters include instructions for determining a new collective setting for a main rotor that is greater than a current collective setting for the main rotor, and that is determined to prevent the main rotor from exceeding a maximum RPM threshold.

14. A flight control computer (FCC) for a rotorcraft, comprising:

a processor; and a non-transitory computer-readable storage medium storing a program to be executed by the processor, the program including instructions for:

monitoring a plurality of first sensor signals indicating a main rotor revolutions per minute (RPM) of the rotorcraft;

determining a predicted main rotor RPM according to the plurality of first sensor signals;

determining one or more target operating parameters according to a second signal indicating one or more operating parameters of the rotorcraft;

determining that a main rotor is in an overspeed condition in response to one of the main rotor RPM or the predicted main rotor RPM falling outside of a threshold associated with the one or more target operating parameters within a predetermined time period;

determining a flight parameter according to the one or more target operating parameters and in response to determining that the main rotor is in the overspeed condition;

sending a set signal to a trim motor indicating a first position of one or more pilot controls according to the flight parameter; and controlling one or more flight control devices of the rotorcraft according to the positioning of the one or more pilot controls.

15. The FCC of claim 14, wherein the instructions for controlling the one or more flight control devices of the rotorcraft according to the positioning of the one or more pilot controls include instructions for receiving a position signal indicating a second position of the one or more pilot controls different from the first position and indicating a manual pilot control of the one or more flight control devices.

16. The FCC of claim 14, wherein the instructions for determining the flight parameter include instructions for determining a collective control setting associated with raising a collective setting of the one or more flight control devices and further associated with decreasing the main rotor RPM.

17. The FCC of claim 16, wherein the instructions for sending the set signal to the trim motor include instructions for sending the set signal and causing the trim motor to drive the one or more pilot controls to the first position while the overspeed condition is maintained.

18. The FCC of claim 16, wherein the program further includes instructions for determining a limit range within a range of movement for the one or more pilot controls and adjusting the flight parameter to maintain the first position of the one or more pilot controls within the limit range.

19. The FCC of claim 14, wherein the instructions for determining the predicted main rotor RPM include instructions for:

determining a rate of change of the main rotor RPM; and determining the predicted main rotor RPM according the main rotor RPM, and the rate of change of the main rotor RPM over a predetermined period of time.

20. The FCC of claim 14, wherein the one or more target operating parameters includes a target main rotor RPM, and wherein the threshold is a 1% variation from the target main rotor RPM.

* * * * *